United States Patent [19]
Weber et al.

[11] Patent Number: 5,995,258
[45] Date of Patent: Nov. 30, 1999

[54] TERMINAL FOR AN OPTICAL NETWORK, OPTICAL NETWORK AND TERMINATING SWITCHING CENTER FOR THE SAME

[75] Inventors: Jens Weber, Kelkheim-Fischbach; Nikolaus Schunk, Hildesheim, both of Germany

[73] Assignee: Robert Bosch GmbH, Stuttgart, Germany

[21] Appl. No.: 08/882,357

[22] Filed: Jun. 25, 1997

[30] Foreign Application Priority Data

Jun. 27, 1996 [DE] Germany ............... 196 25 806

[51] Int. Cl.$^6$ ..................................... H04J 14/02
[52] U.S. Cl. ............................. 359/133; 359/172
[58] Field of Search ............... 359/118, 120–121, 359/133, 154, 172, 125

[56] References Cited

U.S. PATENT DOCUMENTS

| | | | |
|---|---|---|---|
| 4,545,075 | 10/1985 | Miller et al. | 359/172 |
| 5,202,780 | 4/1993 | Fussganger | 359/125 |
| 5,661,582 | 8/1997 | Kintis et al. | 359/172 |

FOREIGN PATENT DOCUMENTS 195 03 041  8/1996  Germany .

OTHER PUBLICATIONS

Funkschau 19/95, p. 55 ff.
"Zukunftssichere Sat–Anlagen", Funkschau 19/92, p. 64 ff.
Funkschau Jul. 1995, p. 26 ff.

*Primary Examiner*—Kinfe-Michael Negash
*Attorney, Agent, or Firm*—Kenyon & Kenyon

[57] ABSTRACT

An optical distribution network capable of an integrated transmission of distribution services and interactive services. With the optical distribution network, a subscriber addressing for the interactive services takes place using a Sub-Carrier Modulation (SCM) technique or an Asynchronous Transfer Mode (ATM) technique. The allocation of the frequency range takes place so that crosstalk between the signals for the distribution services and the interactive services can be prevented using electrical filters.

19 Claims, 4 Drawing Sheets

TERMINAL FOR AN OPTICAL NETWORK, OPTICAL NETWORK AND TERMINATING SWITCHING CENTER FOR THE SAME

FIELD OF THE INVENTION

The present invention relates to a terminal for an optical network, an optical network and a terminating switching center.

BACKGROUND INFORMATION

German Patent Application No. 195 03 041.9 describes an optical network and a terminal for the same. This network has multiple receiving devices for broadband signals. The radio signals transmitted by a specific satellite having a specific polarization are an example of a broadband signal. These radio signals are generally converted in the receiving direction to an intermediate frequency (IF) so that when receiving radio signals from multiple satellites and/or with multiple polarizations, multiple broadband signals with the same intermediate frequency are available. Each of the broadband signals received and converted to the same intermediate frequency is modulated on to a specific optical carrier wavelength and fed to the signal receiver via a common optical fiber. In the signal receiver, selection of the transmitted, modulated optical carrier wavelength first takes place and subsequently demodulation of the selected optical carrier. For further processing of the reconstructed broadband signal with the intermediate frequency, a DES decoder is provided, as described in Funkschau 19/95, pp. 55 ff.

Compared with other conventional networks described in the article "Zukunftssichere Sat-Anlagen" (Future-proof Sat systems), Funkschau 19/92, pp. 64 ff., the network described above is very flexible with regard to expansions. In particular, an expensive matrix switch is unneeded. In the German Application described above, however, the optical network is usable only for distribution services, such as broadcasting. Interactive services, such as telephony, computer networks and video on demand, additionally require a return line, as is described in Funkschau 7/95, pp. 26 ff.

SUMMARY OF THE INVENTION

The arrangement according to the present invention has the advantage that it allows integration of interactive services and distribution services, which provides cost benefits as well as handling benefits. Moreover, services are enabled that are based on a combination of interactive and distribution services. In addition, in a building, only a single network must be installed that integrates all distribution and interactive services. This provides considerable advantages when providing connections (e.g., wiring) in a building. Finally, it is advantageous to provide a terminal for integrated reception of the distribution and the interactive services since this requires only a minimum of adjustment expense for the end user.

Moreover, it is advantageous to equip a terminating switching center with an optical transmitter including lasers and an optical modulator for the forward channel since a central interface to existing copper networks is thus created.

It is also advantageous to subdivide the forward signal into multiple subchannels, each subchannel containing information for a certain quantity of terminals since in this manner multiple terminals can be connected with a common transmission line to a terminating switching center. The connection costs per terminal are thus significantly reduced. This subdivision may thus advantageously be achieved using SCM coding.

Moreover, it is further advantageous to generate the optical carrier for the return signal in a central transmitting device and to modulate the centrally generated carrier in the terminal using a reflection modulator since the repair and interchangability of the laser are thus simplified.

The network, like the terminal, is considerably simplified technically if the return-channel transmitting laser is arranged in the respective terminal. This is advantageous since, e.g., there is no longer any need for a bidirectional fiber amplifier in the network and a channel separating demultiplexer as well as the reflection modulator in the terminal. This yields a cost benefit particularly for small networks.

In that a frequency-selective filter allows selection of light of a specified first wavelength, a greater program variety can be achieved; particularly, the reception of different satellites with a device can be simply implemented.

It is also advantageous to use a direct satellite transmission for transmission of the broadband signal since this infrastructure is already available. Likewise, in most households, receiving devices are already provided for this purpose, and they can thus be used further.

Series connection of a star coupler before the transmission lines provides a particularly reliable and economical as well as easily integratable component for distributing the optical carriers to multiple subscribers.

Combining the optical carriers using the star coupler and the distribution of these optical carriers at the end of a further optical fiber using a second star coupler or a power splitter advantageously serves to reduce the line cost of the transmission apparatus since for multiple, relatively closely spaced terminals the path between power splitter and star coupler leads only via a single optical fiber.

The formation of a part of the optical transmission line used for the transmission of the forward signal or the return signal as a bidirectional optical fiber amplifier is advantageous since in this manner a high continuous output power is achieved with a single laser diode. Economical, central generation of the optical carrier for the return signal is thus enabled.

DETAILED DESCRIPTION

Figure 1:
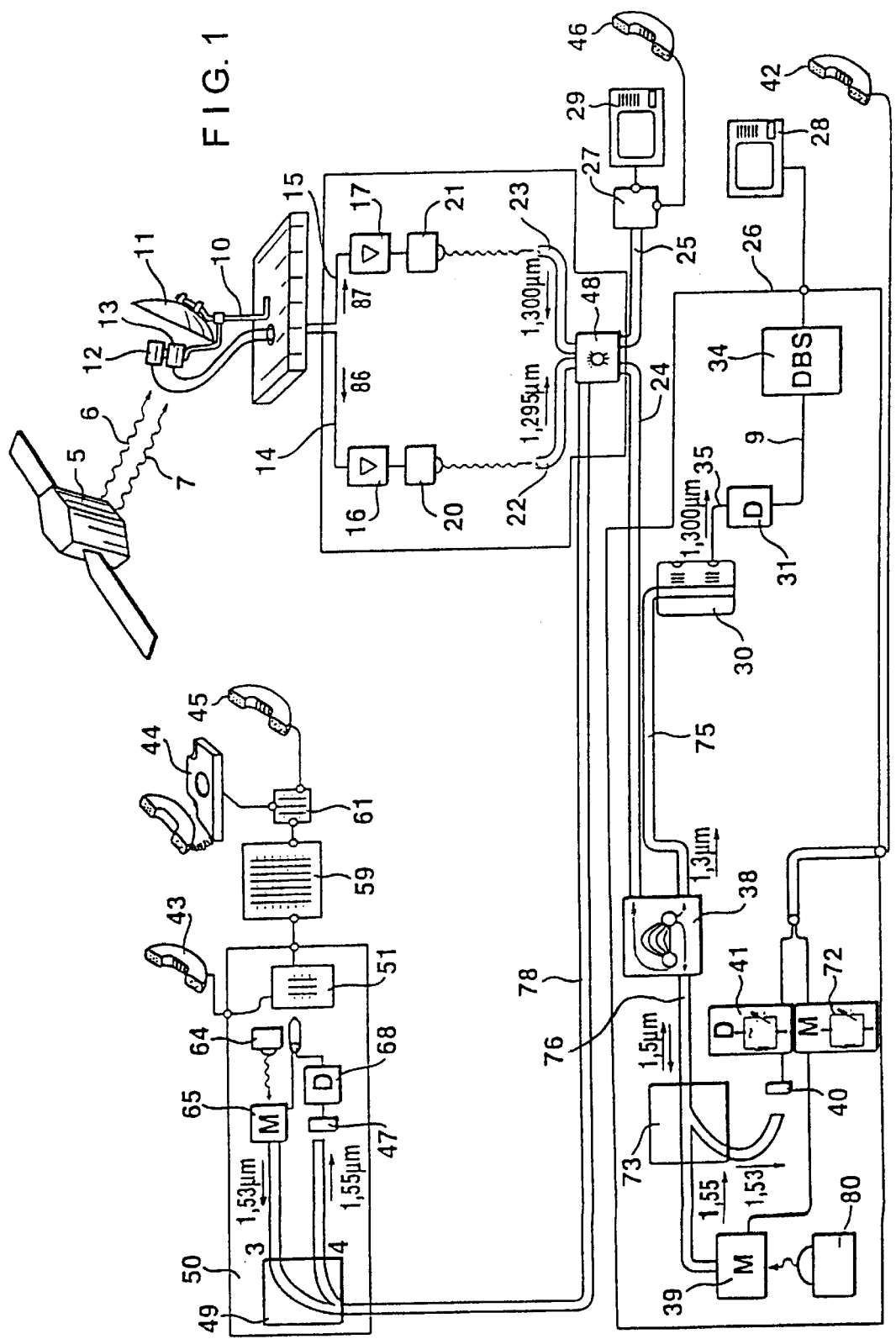
FIG. 1 shows an optical network with two terminals and a terminating switching center connected to the network according to the present invention.

In FIG. 1, a satellite 5 is shown that emits a first horizontally polarized broadband radio signal 6 and a second vertically polarized broadband radio signal 7. A satellite antenna 10 includes a reflector 11, a first receiving converter 13 and a second receiving converter 12. The two receiving converters 12, 13 are designed in a known manner as LNB converters. They are installed before the reflector 11 so that the horizontally polarized radio signal 6 can be received with one of the two receiving converters 12, 13 and the vertically polarized radio signal 7 with the other. The second receiving converter 12 is followed by a first amplifier 17, connected via a first antenna line 15. Likewise, the first receiving converter 13 is followed by a second amplifier 16, connected via a second antenna line 14. The output of the amplifier 16 is connected to the input of the laser diode 20 with the radiation wavelength 1; likewise, the output of the amplifier 17 is connected to the input of the laser diode 21 with the radiation wavelength 2. In the exemplary embodiment shown here, radiation wavelength 1 is 1.295 micrometers, and radiation wavelength 2 is 1.300 micrometers. The signal present on the respective amplifier outputs 16 and 17 thus modulates the light emitted by the laser diodes 20 and 21. The modulated optical output signal of the first laser diode 20 reaches a first optical waveguide (or fiber) 22, which (like a second optical waveguide 23 that forwards the modulated optical output signal of the laser diode 21) is fed to a star coupler 48.

The terminating switching center 50 is likewise connected to the star coupler 48, via the house connection fiber 78. In the terminating switching center 50, there is a coupling field 51 for creating connections to external networks or other communications terminals 43 that are connected to the same terminating switching center 50. On the connection facing the network, the terminating switching center 50 is provided with an optical splitter 49 whose unbranched end is connected to the house connection fiber 78. A return-channel receiving detector 47 is connected to one of the two branches of the optical splitter 49. This return-channel receiving detector 47 is a light sensor that is sensitive to at least one certain wavelength 4. In the selected exemplary embodiment, this wavelength 4 is 1.55 micrometers. The return-channel receiving detector 47 is followed by a return-channel demodulator 68 whose output is connected to the coupling field 51. Moreover, the coupling field 51 is connected to an optical modulator that is used as a forward-signal modulator 65, and modulates the light emitted by a laser diode designed as a forward-channel transmitting element 64 with the wavelength 3. The output of the forward-signal modulator 65 is connected to the second branch of the optical splitter 49.

Moreover, two terminals 26 and 27 are connected to the star distributor 48 via the first transmission line 24 and the second transmission line 25. A first radio device 28 and a communications terminal 42 are connected to the terminal 26; a second radio device 29 and a communications terminal 46 are connected to the terminal 27.

The terminal 26 is shown in detail in FIG. 1. A demultiplexer 38 connects to the first transmission line 24 in the terminal 26, the demultiplexer 38 separating light above and below about 1.4 micrometers. The intermediate transmission fiber 76 for the longer-wavelength light and the intermediate transmission fiber 75 for the shorter-wavelength light are connected to the demultiplexer 38.

The intermediate transmission fiber 76 is connected to an optical splitter 73 whose one branch leads to a forward-channel receiving detector 40, followed by an SCM (Sub-Carrier Modulation) demodulator 41. In the second branch of the optical splitter 73, there is a return-signal modulator 39 and a return-channel transmitting laser 80. The return-signal modulator 39 is connected via the SCM modulator 72 to the communications terminal 42. A wavelength-sensitive optical filter 30 is connected to the intermediate transmission fiber 75. A receiving line 35 with a subsequent modulator 31 is connected to an output of the wavelength-sensitive optical filter 30. A decoder 34 is connected to the demodulator 31 via the line 9. The output of the decoder 34 forms the output of the first terminal 26 and is connected to the first radio device 28. The design of the second terminal 27 is identical to that of the first terminal 26 and is thus not shown in detail here.

Reference is made to FIGS. 2a–2f, 3a–3d and 4 in order to explain the functioning of the apparatus shown in FIG. 1.

Figure 2A:
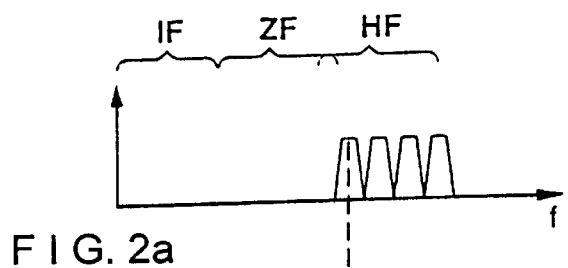
FIG. 2a shows a broadband signal before a modulation of an optical carrier in a high frequency zone.
Figure 2B:
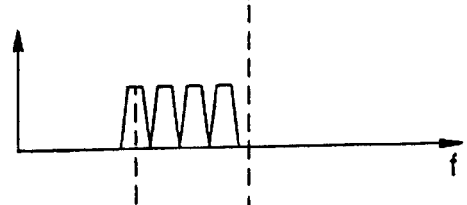
FIG. 2b shows the broadband signal before the modulation of the optical carrier in an intermediate frequency zone.

The second receiving converter 12 is arranged, for example, so that it is suited to receiving the vertically polarized broadband radio signals 6 of the satellite 5, whereas the first receiving converter 13 receives horizontally polarized broadband radio signals 7. Using the first receiving converter 13, the received vertically polarized radio signal 7 is converted from the high-frequency (HF) (radio-frequency RF) range determined by the satellite 5 into an intermediate-frequency (IF), which lies lower than the HF range of the received vertically polarized radio signal 7. Likewise, the second receiving converter 12 causes a frequency conversion of the received horizontally polarized radio signal 6. In the FIGS. 2a and 2c, the received radio signals 6, 7 are shown in the HF range. FIGS. 2b and 2d schematically depict the intermediate frequency signals 86, 87 that are converted to the intermediate frequency (IF) range. The broadband radio signal 6 has, like the broadband radio signal 7, as an example, multiple single frequency bands that are arranged adjacently and correspond to the transponders known from a satellite radio. The transponders of the vertically polarized radio signal 7 are shifted in each case by a half transponder bandwidth with respect to the transponders of the horizontally polarized broadband radio signal 6. The bandwidth of the radio signals 6, 7 is equal to, say, a GHz, the bandwidth of the broadband intermediate frequency signals 86, 87 likewise. Their frequency lies between about one and two Ghz. The broadband intermediate frequency signal 86 reaches the laser diode 20 via the second amplifier 16 in which laser diode 20 the amplified broadband intermediate frequency signal 86 is modulated on to the first carrier wavelength 1. The second amplifier 16 is designed as a control amplifier and causes an adaptation of the signal level to the transmission power of the laser diode 20 so that optimal driving takes place with respect to noise and distortion. The modulation of the input of the laser diode 20 with the broadband intermediate frequency signal 86 causes a widening of the radiated line from 1.295 micrometers by 12.4 picometers. Likewise as described here for the broadband intermediate frequency signal 86, the broadband intermediate frequency signal 87 reaches via the first amplifier 17 to the second laser diode 21, where it modulates the carrier wavelength 2, whereupon this frequency-modulated signal is coupled into the second optical waveguide 23.

Figure 2E:
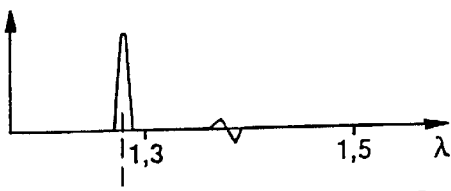
FIG. 2e shows the broadband signal before the modulation of the optical carrier in the intermediate frequency zone after passing through a laser diode.
Figure 2C:
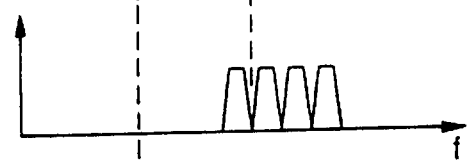
FIG. 2c shows the broadband signal after the modulation of the optical carrier in the high frequency zone.
Figure 2D:
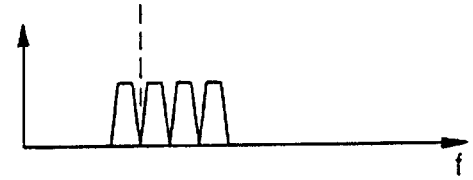
FIG. 2d shows the broadband signal after the modulation of the optical carrier in the intermediate frequency zone.
Figure 2F:
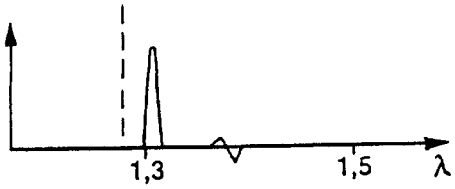
FIG. 2f shows the broadband signal after the modulation of the optical carrier in the intermediate frequency zone after passing through the laser diode.

The modulated spectrum of the optical signal that is emitted by the laser diode 20 is depicted schematically in FIG. 2e; the spectrum of the optical signal that is emitted by the laser diode 21 is depicted schematically in FIG. 2f. A wavelength difference of 0.005 micrometers is provided between the individual laser lines. This separation is sufficiently large in comparison with the line width of 12.4 picometers caused by the modulation in order to assure a clear channel separation. Nonetheless, in the wavelength window between 1.28 micrometers and 1.32 micrometers, up to 8 transmission channels for broadband signals can be set up. This wavelength range is referred to hereafter as the 1.3 micrometer window or the first optical carrier.

The two optical waveguides 22 and 23 are connected to the star coupler 48 in which a distribution of the coupled-in optical frequency-modulated signals into the transmission lines 24 and 25, takes place in about equal shares.

In the first terminal 26, this optical signal reaches a first demultiplexer 38 which separates the first optical carrier from other optical signals still to be considered hereafter. This first optical carrier reaches (via the intermediate transmission fiber 75) the wavelength-selective optical filter 30 which is set so that at its output, in each case only the optical signal of a laser modulated with a single broadband intermediate frequency signal is present. For example, only the output signal having a wavelength of 1.300 micrometers is decoupled, as is shown in FIG. 2f and coupled into the optical waveguide 23. In the demodulation apparatus 31, a demodulation of the output signal of the wavelength-selective optical filter 30 follows so that in the line 9, an electrical broadband intermediate-frequency signal is again present, which (as shown in FIG. 1) is the broadband intermediate-frequency signal 87. In the decoder 34, the further frequency conversion and the decoding of the received selected broadband intermediate-frequency signal and the forwarding of the decoded signal to the radio device 28 then take place in a known manner. The selection of the respective broadband intermediate-frequency signal 86, 87 is normally made by a user of the terminal 26, who either manually adjusts the wavelength-selective filter 30 or has the adjustment of the filter 30 performed by the decoder 34 through an input into the decoder 34. In a similar manner, one of the two radio signals 6, 7 reaches via the second terminal 27 to the second radio device 29.

The selection of which of the two radio signals 6, 7 is to be fed to the decoder 34 thus does not take place until reaching the respective terminals 26, 27. It is thus possible for the user of one of the two terminals 26, 27 to make the selection based on personal preference without influencing the selection of the user of the other terminal. The wavelength-selective optical filter 30 can be, e.g., a Fabry-Perot filter, a grid spectrograph or an array demultiplexer.

Figure 3A:
FIG. 3a shows a forward signal for the interactive services before the modulation of the optical carrier.
Figure 3C:
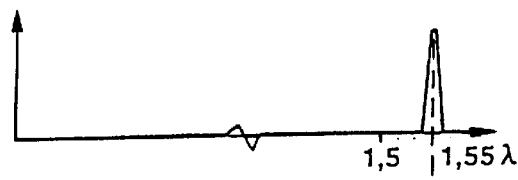
FIG. 3c shows the forward signal for the interactive services after the modulation of the optical carrier.
Figure 3B:
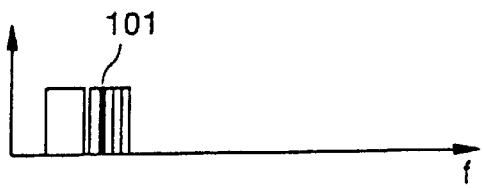
FIG. 3b shows a return signal for the interactive services before the modulation of the optical carrier.
Figure 3D:
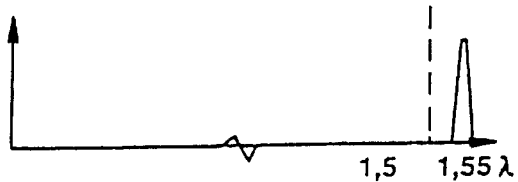
FIG. 3d shows the return signal for the interactive services after the modulation of the optical carrier.

Interactive services demand both an emission of information, the so-called return signal, by the terminal 26, via a socalled return channel, as well as the reception of information, the so-called forward signal, in the same terminal 26, via a so-called forward channel. The transmission of these signals is realized in a second optical wavelength window in the same network. In order to avoid the disadvantages of optical crosstalk, the forward and return signals are additionally placed in another electrical frequency range. As shown in FIGS. 3a–3d, for interactive signal transmission, the electrical frequency ranges between 50 and 850 MHz (intermediate frequency IF) are available, which are not used by the distribution services described in the first section. For example, the frequency range from 50 to 449 MHz can be used for information to be received by the terminal, the forward signals, and the frequency range from 450 to 849 MHz for information to be emitted by the terminal, the return signals. These two frequency ranges are shown in FIGS. 3a and 3b. Moreover, the electrical frequency range is subdivided into 3 MHz-wide subchannels. With this bandwidth of 3 MHz, a transmission rate of 2 megabits per second is possible, which can be limited to 144 kilobits per second through appropriate filter design in a switching center, which corresponds to the ISDN standard. Likewise, the transmission rate can be increased by combining multiple subchannels. The subdivision into subchannels is shown in FIGS. 3a and 3b. The data intended for interactive communication with the terminal 26 are contained in the designated subchannels in FIGS. 3a and 3b. Here, 100 designates the subchannel for the forward signal and 101 the subchannel for the return signal.

For interactive communication, the terminal 26 is equipped with a communications terminal 42. This communications terminal 42 is shown as a telephone in FIG. 1, but it can also transmit data. Moreover, it is also provided that the data received by the communications terminal 42 contain other information than speech information. The data transmitted by the communications terminal 42 are first converted in the SCM modulator 72 into the subchannel 101 assigned to the terminal 26. The electrical signal generated by the SCM modulator 72, the so-called return signal, is used in an optical modulator (the return-signal modulator 39) to modulate the light generated by the return-channel transmitting laser 80. As the wavelength 4 of the light radiated by the return-channel transmitting laser 80, 1.55 micrometers was chosen. The light modulated with the return signal having the wavelength 4 is shown schematically in FIG. 3d. The light modulated with the return signal passes the optical splitter 73 in the reverse direction so that the optical splitter 73 has no consequences in the context observed here. The light modulated with the return signal reaches via the intermediate transmission fiber 76 to the output of the first demultiplexer 38, which must be configured in design terms so that it does not prevent a propagation of light with 1.5 micrometers from the intermediate transmission fiber 76 to the first transmission line 24. It is unimportant for the functionality of the terminal and the optical network whether a part of the light modulated with the return signal can reach into the intermediate transmission fiber 75. The light modulated with the return signal reaches via the star coupler 24 into the house connection fiber 78 and through this to the terminating switching center 50. A part of the light reaches through the optical splitter 49 to the return-channel receiving detector 47 and the demodulator 68 connected thereafter, through which the original information is recreated. This information is forwarded via the coupling field 51 to another communications terminal. The communications terminal can be a telephone, but it can also be any data processing system. In particular, an apparatus for machine-based processing, e.g., of a video request, can be provided.

Similar technical apparatuses are provided for the optical transmission of the forward channel. Reference is made again to FIGS. 3a–3d for more precise explanation of the functioning. For the forward signals, as shown in FIG. 3a, the frequency range from 50 to 449 MHz is provided, which is again subdivided into 3 MHz-wide subchannels. The subdivision into subchannels is shown in FIG. 3a. The subchannel containing the forward signal intended for the terminal 26 is designated in FIG. 3a with the reference number 100.

The electrical signal from FIG. 3a is used in order to modulate the radiation emitted by the forward-channel laser 64 using the forward-channel modulator 65. As illustrated by FIG. 3a, the SCM-multiplexed signal contains the forward signals for all terminals 26 and 27 connected to the optical network. The wavelength 3 of the forward-channel laser 64 is equal to 1.53 micrometers. The light modulated with the forward signal passes the optical splitter 49 in the terminating switching center 50 in the reverse direction and is forwarded via the house connection fiber 78 to the star coupler 48. Via the star coupler 48, the light modulated with the forward signal is available to the terminal 27, as well as to the terminal 26. In the terminal 26, the light modulated with the forward signal is routed into the intermediate transmission fiber 76. The light modulated with the forward signal reaches the forward-channel receiving detector 40 via the optical splitter 73. Light that reaches through the splitter 73 to the return-signal modulator 39 does not impair the functioning of the terminal or the optical network. In the forward-channel receiving detector 40, the light modulated with the forward signal is converted into the electrical forward signal with the full bandwidth. In the subsequent SCM demodulator 41, which is specially aligned for the respective terminal 26, the subchannel intended for the terminal (shown in black in FIG. 3a) is cut out and converted to a frequency that can be processed by the communications terminal 42. In this SCM demodulator 41, a further data-protection-related modulation or coding can possibly be undone. The terminalspecific interactive service thus bases, like the distribution service offered in the 1.3 micrometer window, on a distribution to all connected terminals. It is not individualized until the terminal in that, through technical prerequisites, particularly the SCM demodulator, which is specific to a certain terminal, a terminal 26 can output exclusively the information intended for this terminal 26 to the communications terminal 42.

Figure 4:
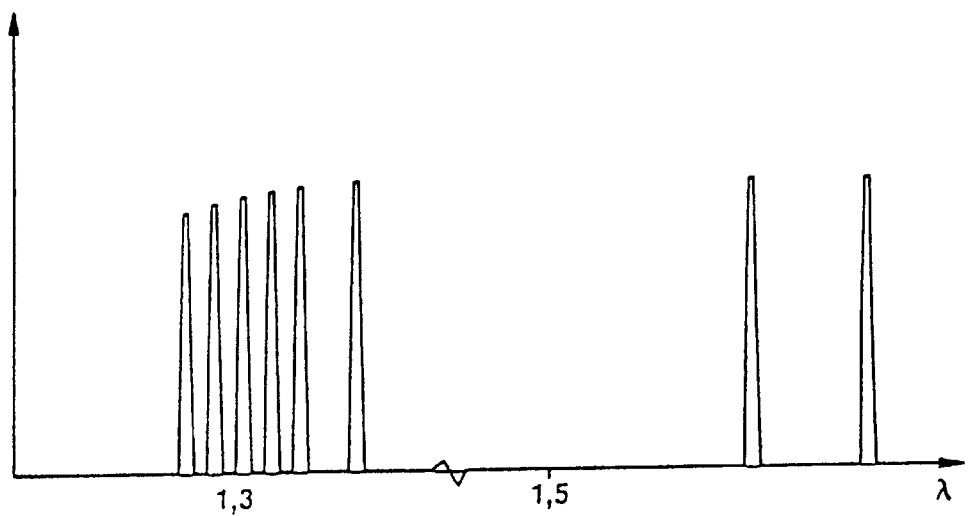
FIG. 4 shows the optical signal that is present at an output of a star coupler.

The optical multiplex signal, as results from the superimposition of the optical signals for 6 distribution services and for the interactive services, and in the latter case in turn for forward and reverse signals, is shown in FIG. 4. This represents simultaneously the signal as is present at the input of one of the terminals 26, 27.

Figure 5:
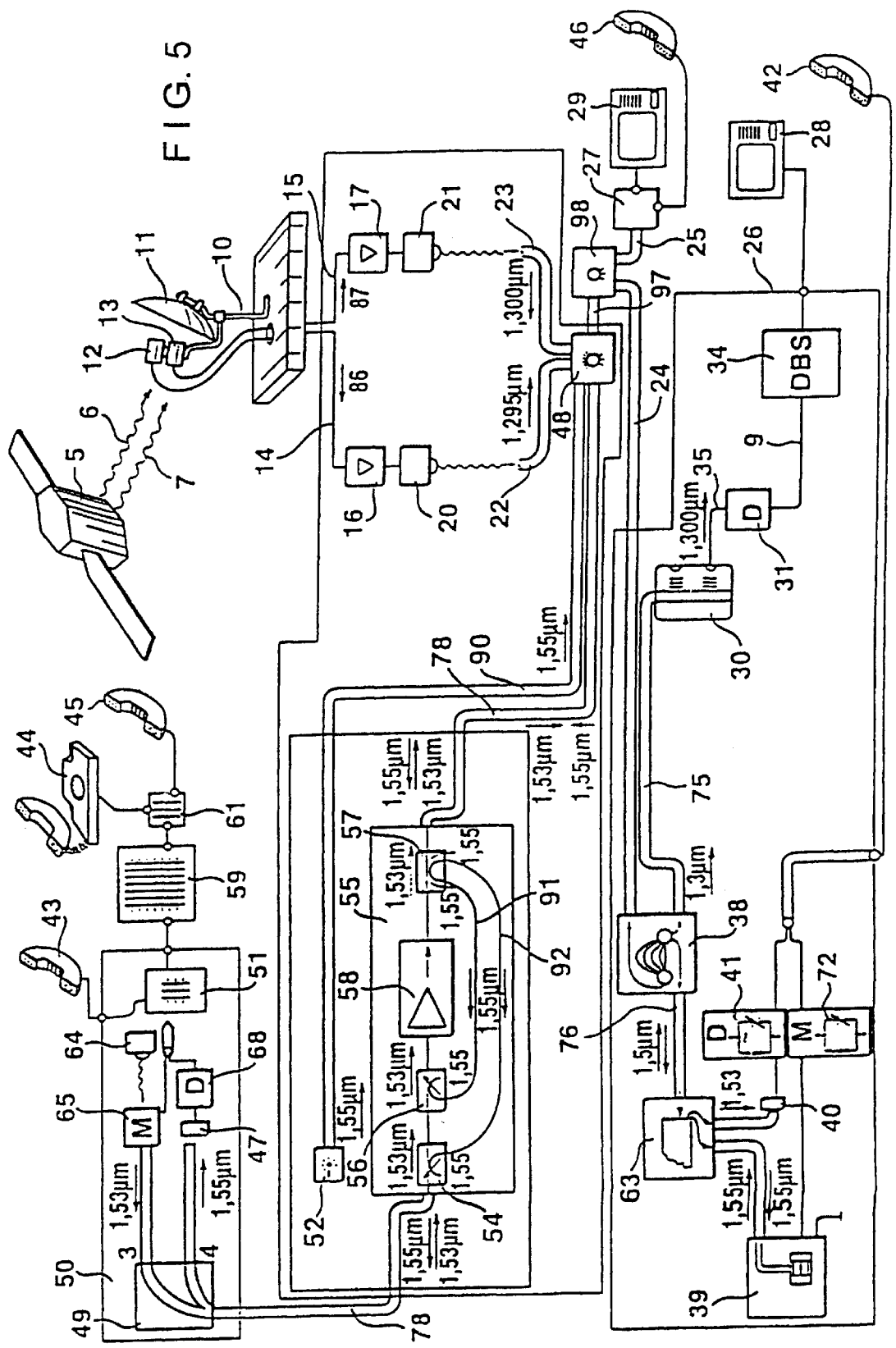
FIG. 5 shows another network in which the optical carrier for the return signal is generated outside of the terminal.

FIG. 5 shows another embodiment for the optical network and a terminal for the same according to the present invention. This arrangement differs from the embodiment described with references to FIG. 1, particularly in the structure of the optical transmission path for the 1.5 micrometer window for distribution of interactive services.

In the terminal 26, instead of the reverse-channel transmitting laser 80, a reflection modulator 39 is provided an optical connection to a channel separation demultiplexer 63 instead of the optical splitter 73 shown in FIG. 1. The channel separation demultiplexer 63 is arranged such that its connection for the multiplex signal points to the demultiplexer 38, its 1.55 micrometer connection to the above mentioned reflection modulator 39, and its 1.53 micrometer connection points to the forward-channel receiving detector 40. As in the first embodiment shown in FIG. 1, an SCM demodulator 41 and a communications terminal 42 are connected to the forward-channel receiving detector 40.

The input of the multiplexer 38 also forms the input of the terminal 26, which is connected to the first transmission line 24. This first transmission line 24 forms one of the outputs of the power splitter 98, whose input is connected to the output of the star coupler 48 via the central line 97. The star coupler 48, the central line 97 and the power splitter 98 together replace the star coupler described in the first embodiment. The power splitter 98 is used for information distribution to closely neighboring terminals. The star coupler 48 is connected to the terminating switching center 50 via the house connection fiber 78, of which a part is formed as a bidirectional fiber amplifier 55. The bidirectional fiber amplifier 55 contains a unidirectional fiber amplifier 58 whose direction of passage points from the terminating switching center 50 towards the star coupler 48. At the output of the unidirectional fiber amplifier 58, a wavelength-selective bidirectional coupler 57 is connected; at the input of the unidirectional fiber amplifier 58, two unidirectional wavelength-selective couplers 54 and 56 are connected in series. The bidirectional wavelength-selective coupler 56 lying closer to the unidirectional fiber amplifier 58 is connected such that it couples-in light to be in the direction of the fiber amplifier 58, whereas the unidirectional wavelength-selective coupler 54 farther removed from the unidirectional fiber amplifier 58 couples-in a signal in the direction of the terminating switching center 50. All three wavelength-selective couplers 54, 56 and 57 create the coupling only for light at 1.55 micrometers, but not for light with a wavelength of 1.53 micrometers. Additionally, an external optical wiring of the wavelength-selective couplers 54, 56 and 57 is made. A first return-coupling fiber 91 connects the input of the wavelength-selective coupler 57 facing the unidirectional fiber amplifier 58 to the input of the unidirectional wavelength-selective coupler 56 facing away from the unidirectional fiber amplifier 58; a second return-coupling fiber 92 connects the input of the bidirectional wavelength-selective coupler 57 facing away from the unidirectional fiber amplifier 58 to the input of the unidirectional wavelength-selective coupler 54 facing the unidirectional fiber amplifier 58.

At the other end of the house connection fiber 78, the bidirectional fiber amplifier 55 is connected to the terminating switching center 50, which has an optical splitter 49 whose simple connection is connected to the house connection fiber 78, and whose one branched connection is connected to the return-channel receiving detector 47 and the demodulator 68, and whose other end is connected to the forward-channel modulator 65 and the forward-channel transmitter 64. The coupling field 51 is connected to the forward-channel modulator 65 and the demodulator 68 as shown in FIG. 1.

To clarify the functioning of the exemplary embodiment in FIG. 5, particularly the distribution of the distribution services, reference is made to the functional description for FIG. 1. Likewise, the channel and subchannel distribution for the interactive services remain substantially unchanged.

The light with a wavelength of 1.55 micrometers, which is used as an optical carrier for the return signal, is generated in a centrally arranged return-channel transmitting element 52. This central return-channel transmitting element can be located, say, at an easily accessible point in the network, but it is possible to arrange the return-channel transmitting element 52 along with or in a terminating switching center. The carrier radiated by the return-channel transmitting element for the return signal is made available to the terminals 26 and 27 via the return-channel carrier supply fiber 90, the star coupler 48. In the terminal 26, the carrier is forwarded to the reflection modulator 39 via the demultiplexer 38 and the channel separation demultiplexer 63. In the reflection modulator 39, the incoming, unmodulated carrier is modulated with the return signal and sent back via the same transmission path to the star coupler 48 via the channel separation demultiplexer 63, the demultiplexer 38, the first transmission line 24, the power splitter 98 and the central line 97. Here, when setting up the channel separation demultiplexer 63 and the demultiplexer 38, it must be taken into account that the light path for light with 1.55 micrometers wavelength must be reversible. However, it is unimportant for the functionality of the terminals as well as the optical network whether in addition light with a wavelength of 1.55 micrometers arrives at the forward-channel receiving detector 40 or also the filter 30 since the return signal is filtered out due to its other electrical modulation frequency. In the house connection fiber 78, light with a wavelength of 1.55 micrometers is thus found that was modulated by the terminal 26, as well as the same carrier that was modulated with a return signal from terminal 27. These carriers become superimposed without interference since the modulation took place in different subwindows. In order to compensate for the high losses due to the different optical components, the carrier modulated with the return signal is amplified in a bidirectional fiber amplifier 55 and then forwarded to the terminating switching center 50, where it is processed in the manner known from the description for FIG. 1.

The functioning of the bidirectional fiber amplifier 55 will now be explained in greater detail. The forward signal emitted by the terminating switching center, which is modulated on to a 1.53 micrometer carrier, passes the two unidirectional wavelength-selective couplers 54 and 56 unaffected and is amplified in the fiber amplifier doped as erbium (erbium-doped fiber amplifier). The bidirectional wavelength-selective coupler 57 is also passed without an effect on the optical signal. The fiber amplifier 58 is impenetrable for light of any wavelength propagating from the star coupler 48 in the direction of the terminating switching center 50. However, if the wavelength of the light incident in this direction is 1.55 micrometers, then it is coupled to the bidirectional wavelength-selective coupler 57 and forwarded via the first return-coupling fiber 91 to the unidirectional wavelength-selective coupler 56, through which this light is forwarded to the unidirectional fiber amplifier 58 in its direction of passage. The coupled-in signal is thus amplified and now reaches for the second time the bidirectional wavelength-selective coupler 57, but in the opposite direction, which is why it is forwarded via the second return-coupling fiber 92 to the first unidirectional wavelength-selective coupler 54. This couples the amplified signal in the original direction of propagation again into the house connection fiber 78.

Instead of via two converters, the radio signals 6, 7 can also be received via individual converters, each with its own reflector. It is further provided to modulate not only broadband radio signals of different polarization directions but also the radio signals received from different directions (orbital positions of satellites) on to different carrier wavelengths 1, 2. It is also possible to provide more than two broadband radio signals for transmission in such a network. A preferred application area for the optical network is integrated, apartment-by-apartment allocation of satellite signals and interactive services, such as telephony and interactive radio. The optical multiplexing enables transmission of more broadband radio signals to the terminal than is possible according to the current standard. The increase in offerable distribution services makes it possible to blur the borderline between interactive services and distribution services, for which purpose the optical network is preferably suited with a terminal which processes both services in a terminal.

For example, it is possible to request information via the return channel, but it is not necessary for the transmission of the information to take place on the forward channel. Instead, only the transmission of a decoding key or a clearing of a radio signal received via satellite takes place on the forward channel. Such application is useful for network-dependent computer systems, where a high transmission rate is desirable but a long usage duration for the transmission path is not necessary. However, this procedure would additionally require a switchable cross-connection between the communications terminal 42 and the first radio device 28.

It is also possible to request a radio transmission via the return channel. The transmission takes place via the forward channel. For the "video on demand" service, the received data are stored along with a decoding key on a storage medium, e.g., on a hard disk in the terminal. They are thus available for evaluation or for viewing. Data transmission via online services is possible in the same manner.

Besides SCM techniques for subscriber selection in the distribution network, the ATM (Asynchronous Transfer Mode) transmission technique can be used for the forward channel since the terminal identification is contained in the header of the ATM cell. In the return channel, the ATM technique is not usable since the users of the terminals in the star network can use the return channel independently of one another, making possible an overlapping in time of the return signals.

We claim:

1. A terminal for connecting to an optical network via an optical connection, the terminal comprising:

a first device receiving a first light signal with a first wavelength, the first light signal being modulated using a broadband signal;

a second device receiving a second light signal with a second wavelength, the second light signal being modulated using a forward signal;

a third device at least one of receiving and generating a third light signal with a third wavelength, the third light signal being modulated using a return signal; and an arrangment decoupling the first, the second and the third light signals.

2. The terminal according to claim 1, wherein the forward signal includes a Sub-Carrier Modulation (SCM) signal, and wherein at least one of a plurality of subchannels of the forward signal is processable.

3. The terminal according to claim 1, wherein the return signal includes a Sub-Carrier Modulation (SCM) signal, and wherein at least one of a plurality of subchannels of the return signal is processable.

4. The terminal according to claim 1, wherein the third device includes a reflection modulator.

5. The terminal according to claim 1, wherein the third device includes a return-channel transmitting laser unit generating the third light signal.

6. The terminal according to claim 1, further comprising: a frequency-selective filter selecting the first light signal.

7. The terminal according to claim 1, further comprising:

a Direct Broadcast Satellite (DBS) demodulator converting the broadband signal to a radio signal and connected to the first device, the radio signal being receivable by a radio receiver.

8. The terminal according to claim 1, wherein the broadband signal includes a Direct Broadcast Satellite (DBS) signal, the DBS signal being received from a satellite and converted to an intermediate frequency.

9. An optical network including optical transmission fibers, comprising:

at least one first connection port connected to a broadband receiving device for receiving broadband signals;

at least one optical connection port connect to a terminal;

a laser unit connected to the at least one first connection port, the laser unit being modulated by the broadband signals to provide a first light signal having a first wavelength, the first light signal being transmitted from the laser unit to the at least one optical connection port; and at least one second connection port connected to a house connection fiber and transmitting a second light signal having a second wavelength to the at least one optical connection port, the second light signal being modulated with a forward signal, wherein the at least one optical connection port transmits a third light signal having a third wavelength to the at least one second connection port, the third light signal being modulated with a return signal, and wherein the first, the second and the third wavelengths are different from one another.

10. The optical network according to claim 9, wherein the at least one second connection port transmits the third light signal to the at least one optical connection port.

11. The optical network according to claim 9, further comprising:

at least one star distributor having at least three distributor connection ports and a distributor signal, the distributor signal being applied to each of the at least three distributor connection ports, at least one of the at least three distributor connection ports being connected to the at least one optical connection port via at least one of the optical transmission fibers.

12. The optical network according to claim 11, wherein the first, second, and optical connection ports are connected to the at least one star distributor via at least one of the optical transmission fibers.

13. The optical network according to claim 9, wherein the forward signal includes a Sub-Carrier Modulation (SCM) signal composed of multiple subchannels, each of the multiple subchannels including information for a predetermined number of terminals.

14. The optical network according to claim 9, wherein the forward signal includes an Asynchronous Transfer Mode (ATM) signal.

15. The optical network according to claim 9, wherein the return signal includes an Sub-Carrier Modulation (SCM) signal composed of multiple subchannels, each of the multiple subchannels including information for a predetermined number of terminals.

16. The optical network according to claim 9, further comprising:

a terminating switching center connected to the house connection fiber.

17. The optical network according to claim 16, wherein at least one of a portion of the optical transmission fibers transmitting at least one of the forward signal and the return signal, and the house connection fiber includes a bidirectional optical fiber amplifier.

18. The optical network according to claim 9, wherein the broadband signals include a Direct Broadcast Satellite (DBS) signal received from a satellite.

19. A terminating switching center for facilitating interactive services between a plurality of terminals of at least one optical network, comprising:

a forward-channel laser generating a first light signal with a first wavelength;

a forward-signal modulator modulating the first light signal using an aggregate forward signal, the aggregate forward signal including forward signals for at least two of the terminals; and a return-channel receiving detector associated with the forward-signal modulator and receiving a second light signal with a second wavelength modulated using a return signal.

\* \* \* \* \*